(12) United States Patent
Freitag et al.

(10) Patent No.: US 7,968,817 B2
(45) Date of Patent: Jun. 28, 2011

(54) LASER WELD PROCESS FOR SEAM WELDED ELECTROCHEMICAL DEVICES

(75) Inventors: Gary L. Freitag, East Aurora, NY (US); Dominick Frustaci, Williamsville, NY (US); Mark J. Roy, Buffalo, NY (US)

(73) Assignee: Greatbatch Ltd., Clarence, NY (US)

( * ) Notice: Subject to any disclaimer, the term of this patent is extended or adjusted under 35 U.S.C. 154(b) by 1284 days.

(21) Appl. No.: 11/548,314

(22) Filed: Oct. 11, 2006

(65) Prior Publication Data
US 2010/0326967 A1    Dec. 30, 2010

(51) Int. Cl.
*B23K 26/26*    (2006.01)
*B23K 26/40*    (2006.01)

(52) U.S. Cl. .................... 219/121.64; 429/185

(58) Field of Classification Search ............ 219/121.63, 219/121.64; 429/185
See application file for complete search history.

(56) References Cited

U.S. PATENT DOCUMENTS

| | | | |
|---|---|---|---|
| 5,740,196 A * | 4/1998 | Johnson et al. ............. | 373/71 |
| 5,811,055 A * | 9/1998 | Geiger ........................ | 266/49 |
| 6,045,944 A | 4/2000 | Okada et al. | |
| 6,264,708 B1 | 7/2001 | Haraguchi et al. | |
| 6,573,001 B1 * | 6/2003 | Shinohara et al. .......... | 429/185 |
| 6,924,059 B1 * | 8/2005 | Kawakami et al. .......... | 429/162 |
| 2003/0059677 A1 | 3/2003 | Shinohara et al. | |
| 2004/0048147 A1 | 3/2004 | Muraoka et al. | |
| 2004/0062985 A1 | 4/2004 | Aamodt et al. | |
| 2004/0131924 A1 | 7/2004 | Anglin et al. | |
| 2006/0178708 A1 * | 8/2006 | Rorvick et al. ............. | 607/36 |

FOREIGN PATENT DOCUMENTS

| JP | 02006255758 A | * | 9/2006 |
|---|---|---|---|
| RU | 1345499 A1 | * | 11/1993 |

* cited by examiner

*Primary Examiner* — Samuel M Heinrich
(74) *Attorney, Agent, or Firm* — Michael F. Scalise

(57) ABSTRACT

A method for making an electrochemical device enclosure is described. The methods comprises the steps of forming first and second casing members; inserting electrochemically active materials within the first casing member; mating the first casing member to the second casing member, thereby forming an interface therebetween; providing a laser welding apparatus comprising a laser; intermittently turning a laser beam on and off while traversing the laser in a first welding pass 360 degrees along the perimeters of the first and second casing members, thereby forming a first intermittent set of welded and unwelded sections at the interface between the casing members; and intermittently turning the laser beam on and off while traversing the laser in a second welding pass 360 degrees along the perimeters of the first and second casing members, thereby forming a second intermittent set of welded sections at the interface between the first and second casing members. The first and second intermitted welded sections combine to provide a complete hermetic seal around and along the circumference of the casing members interface.

33 Claims, 9 Drawing Sheets

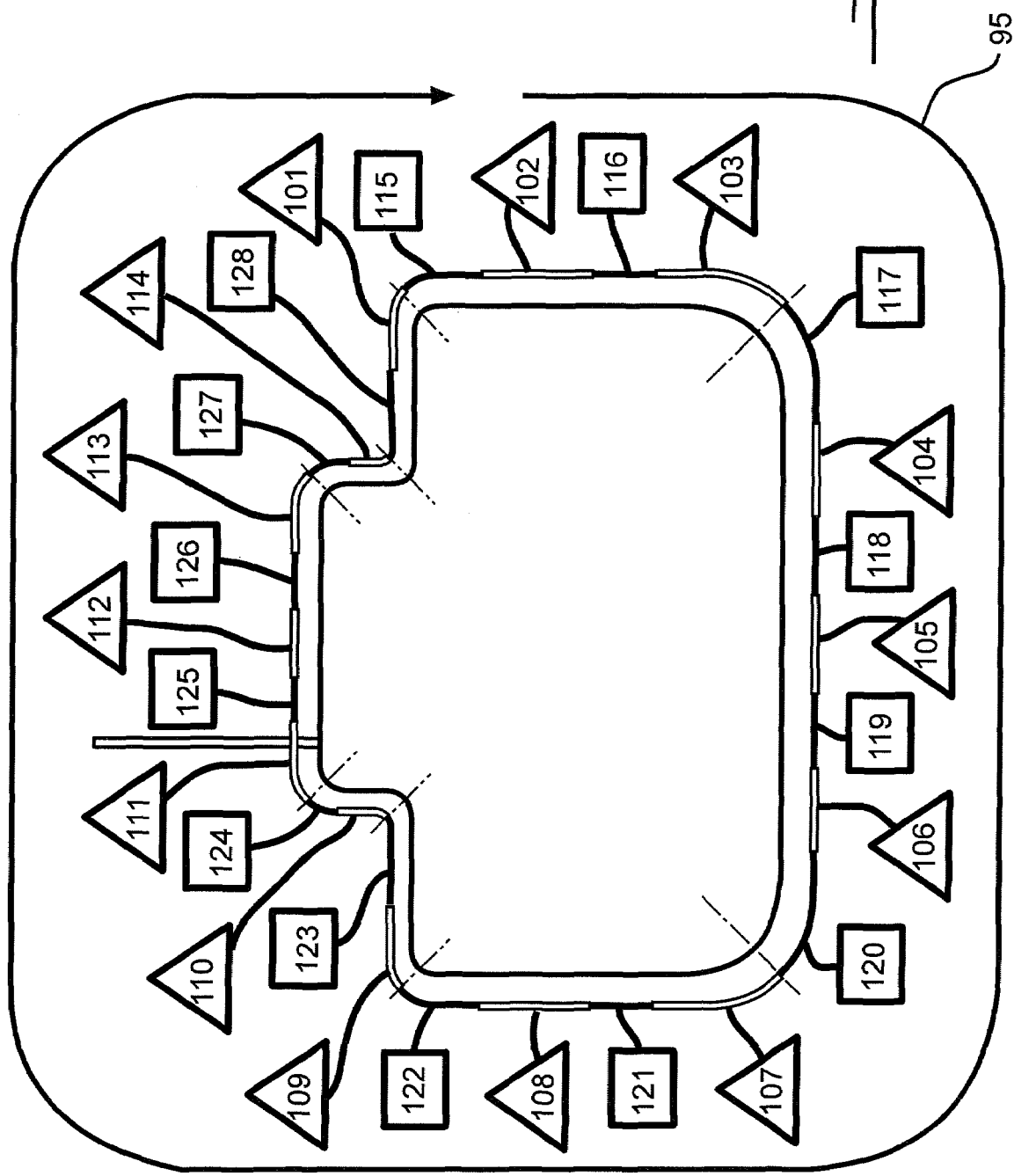

LASER WELD PROCESS FOR SEAM WELDED ELECTROCHEMICAL DEVICES

BACKGROUND OF THE INVENTION

1. Field of the Invention

The present invention relates generally to the fabrication of enclosures for electrochemical devices. More particularly, the present invention relates in one embodiment to sealing two portions of an electrochemical device enclosure to each other by a laser welding process.

2. Description of Related Art

Improving packaging efficiency of electrochemical devices such as electrochemical cells and capacitors is critical to many applications, especially for implanted devices. Hence, any space within the electrochemical device that can be utilized for active material contributes to improving the overall performance and longevity of the electrochemical device and, therefore, that of the implantable device that is being powered. For devices that are contained within enclosures comprised of two portions that are welded together, clearances must be provided in proximity to laser welds (or other fusion joining structures) to prevent thermally induced melt damage to internal components. Alternatively, insulators must be used which thermally protect the internal components of the electrochemical device. For example, a ribbed insulator which creates air pockets proximate to the welded seam within the device may be used. Such a ribbed insulator is disclosed in U.S. Pat. No. 6,933,074 to Frustaci et al., which is assigned to the assignee of the present invention and incorporated herein by reference.

The outside casing of a hermetically sealed battery or capacitor is typically stamped or deep drawn to its final shape and mated with a lid or second case half. The two "halves" must be sealed after the internal components are housed therein. The seam welding operation requires significant heat input at the interface of the casing halves, which produce temperatures within the casing that can damage the internal components. There also is a final close seal required after electrolyte is dispensed and the device is filled. Various welded seam configurations for electrochemical devices are described and shown in U.S. Pat. No. 6,613,474 to Frustaci et al., which is assigned to the assignee of the present invention and incorporated herein by reference.

U.S. Pat. No. 6,264,708 to Haraguchi et al., which is incorporated herein by reference, discloses a method of manufacturing a prismatic battery. A sealing plate is abutted to an upper open end of a prismatic case in which power generating elements are housed. Laser beams are moved along an abutment line parallel to the straight line of each side. In this manner, each side of the abutment line including each of the corners is laser welded, thereby hermetically sealing the prismatic case. In the method of Haraguchi et al., the entire length of each of the four sides is completely welded, corner-to-corner.

FIG. 1 is an illustration of the method and apparatus for laser welding a battery casing according to Haraguchi et al. In one embodiment, the opposed short sides 2 and 4 of a rectangular battery casing are welded as indicated by arrows 99A and 99B. Then, a first long side 6 of the rectangular casing is welded by laser 5 as indicated by arrow 98A, and then the second long side 8 of the battery casing is welded by laser 7 as indicated by arrow 98B to complete the joining of the sealing plate 3 to the prismatic case 1. Haraguchi et al. indicate that it is preferable to weld the opposed long sides 6 and 8 of the casing serially "so that thermal effects [of the welding] on the battery can be suppressed." However, nowhere in the Haraguchi et al. patent is there shown or suggested a method according to the present invention in which short sections of a weld seam are sequentially welded using a plurality of welding passes around the perimeter of the cell. This is done in order to form the entire welded seam without causing adverse thermal effects on the internal battery components.

SUMMARY OF THE INVENTION

It is, therefore, an object of this invention to provide a method for welding a seam of an electrochemical device in a manner that reduces the internal peak temperature below the point where damage can occur, yet still achieves the necessary weld penetration and microstructure throughout the entire welded seam.

According to the present invention a method for making an electrochemical device enclosure including a welded seam is provided comprising a combination of steps. In a first step, there is formed a first casing member comprising a first surrounding side wall defining a first perimeter and extending to and meeting with a continuous first major face wall, and a second casing member comprising a second surrounding side wall defining a second perimeter and extend to and meeting with a continuous second major face wall. The first and second casing members are typically of a metallic material in order that the casing may act as a portion of an electrode in the electrochemical device. Electrochemically active materials are housed within the first casing member. The electrochemically active materials may be the anode active material and cathode active material of an electrochemical cell, or an electrolytic or electrochemical capacitor.

The first casing member is then mated with the second casing member. A first outer edge of the first surrounding side wall of the first casing member is in direct contact with a second outer edge of the second surrounding side wall of the second casing member. This forms an interface between the casing members housing the electrochemically active materials therein. A laser welding apparatus is provided for welding the casing members together at the interface. The laser welding apparatus is comprised of a laser for providing a laser beam, and a fixture adapted for holding and maintaining the first and second casing members in direct contact with each other during welding.

First, the casing members are welded to each other by intermittently turning the laser beam on and off while traversing a first pass completely around and along the perimeters of the casing members. In this manner, a first intermittent set of welded and unwelded sections is formed between the first and second casing members. Then, the casing members are hermetically secured to each other by intermittently turning the laser beam on and off while traversing a second pass completely around and along the perimeters of the casing members. In the second pass, the laser beam is directed to the unwelded sections of the interface between the first and second casing members.

In one embodiment, the entire welding process is completed in two passes with the first and second intermittent sets of welded sections forming a continuous weld seam at the interface between the first and second casing members. This joins the casing halves to each other and seals their interface. In other embodiments, three or more passes may be used to form the continuous weld seam. The casing halves may be formed such that when they are mated together, a butt seam or an overlap seam is formed.

Traversing the laser completely around and along the perimeters of the first and second casing members may be accomplished in various ways. In one embodiment, the mated casing members are held stationary and the laser is moved in a 360 degree pathway around the perimeters of the mated casing members. In another embodiment, the laser is held in a fixed position, or a position of limited motion, and the first and second casing members are rotated about an axis perpendicular to the first major face wall of the first casing member and the second major face wall of the second casing member.

Additionally, the laser may be moved linearly so that the length of the laser beam is maintained constant. In other words, the distance from the laser output optics to the point of incidence on the interface between the casing members is maintained constant. In this manner, the focus of the laser on the interface is maintained, and a more uniform seam weld is obtained.

The laser may also be moved linearly and rotationally during its traverse completely around and along the perimeters of the first and second casing members, such that the laser beam is maintained perpendicular to the first surrounding sidewall of the first casing member and the second surrounding sidewall of the second casing member. By maintaining the angle of incidence of the laser perpendicular to the casing members, the spot size of the laser on the interface is maintained. This results in a more uniform seam weld. Additionally, data on the particular size and shape of the device being welded may be provided to a control system. The various linear and rotational actuators that direct the laser beam and/or rotate the casing members may be controlled in a manner so that the rate of advancement of the laser beam along the interface between the first and second casing members is maintained constant. Such control also provides a more uniform seam weld.

The electrochemical device enclosure may have an irregular shape, and the interface between the casing halves may include exterior corners and interior corners. Since heat transfer rates are generally higher at such corner regions, advantageous results may be obtained by welding a first half of a particular corner in a first welding pass, and then a second half of the corner in a second welding pass. In one embodiment in which the casing halves include one or more interior corners, they are welded in such a first half-second half sequence. An interior corner is defined as one where two sidewalls on the same casing portion meet at a junction and their included angel is less than 180°. In this manner, the heat flux into the device enclosure at the inner corners is maintained sufficiently low to keep internal temperatures below the limit at which damage to the internal cell components can occur. In another embodiment, all of the internal and external corners of the device enclosure are welded in first half-second half sequences, i.e., the first halves of the corners are welded in the first welding pass, and the second halves of the corners are welded in the second welding pass.

The foregoing and additional objects, advantages, and characterizing features of the present invention will become increasingly more apparent upon a reading of the following detailed description together with the included drawings.

BRIEF DESCRIPTION OF THE DRAWINGS

The present invention will be described by reference to the following drawings, in which like numerals refer to like elements, and in which:

FIG. 9 is a schematic illustration of a second sequence of laser welds of the enclosure shown in FIG. 2 according to the second embodiment of the present invention.

Figure 1:
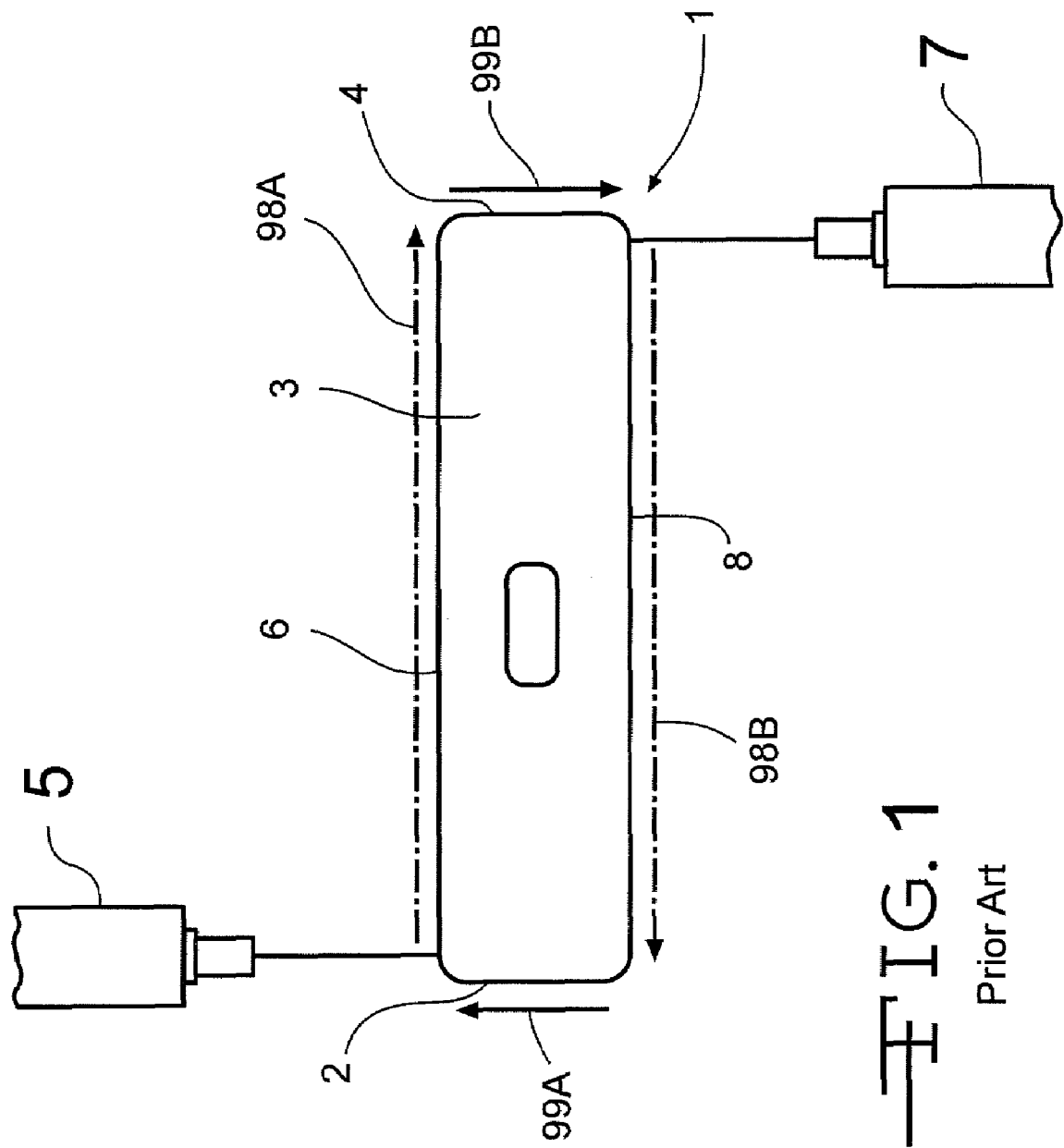
FIG. 1 is an illustration of one prior art method and apparatus for laser welding a battery casing.

The present invention will now be described in connection with a preferred embodiment, however, it should be understood that there is no intent to limit the invention to the embodiments described. On the contrary, the intent is to cover all alternatives, modifications, and equivalents as may be included within the spirit and scope of the invention as defined by the appended claims.

DETAILED DESCRIPTION OF THE PREFERRED EMBODIMENTS

For a general understanding of the present invention, reference is made to the drawings. In the drawings, like reference numerals have been used throughout to designate identical elements.

In the method of the present invention, short sections of a hermetic seam are sequentially welded in a manner that reduces the internal peak temperature within the electrochemical device enclosure below that at which damage to the internal components can occur. However, the welding process still achieves the necessary weld penetration and microstructure throughout the entire hermetic weld seam.

The series of separated welded segments are of limited length and have sufficient unwelded distance there between to limit the amount of heat generated at a given weld location. The unwelded portions between weld segments are subsequently welded after a sufficient amount of time has passed to allow for heat dissipation, thereby limiting the internal peak temperature produced anywhere along the seam weld.

The maximum length of any given weld segment, and the length of the unwelded segments are determined based on the particular weld settings (such as laser energy, spot size, and spot overlap), heat conductivity of the materials, heat sinking and dissipation from fixtures, device geometrical configuration, and the temperature at which damage occurs to internal components. The welded and unwelded segments may have varying lengths. One preferred embodiment is to transverse the perimeter of the device twice, thereby allowing the heat generated at any give segment to cool before an adjoining segment is welded. However, numerous segment orders, numbers of segments, and numbers of passes may be combined to achieve satisfactory results. Some degree of overlap of the welds between a first pass segment and a subsequent pass may also occur to ensure homogeneity of the weld at the segment junctures.

Figure 2:
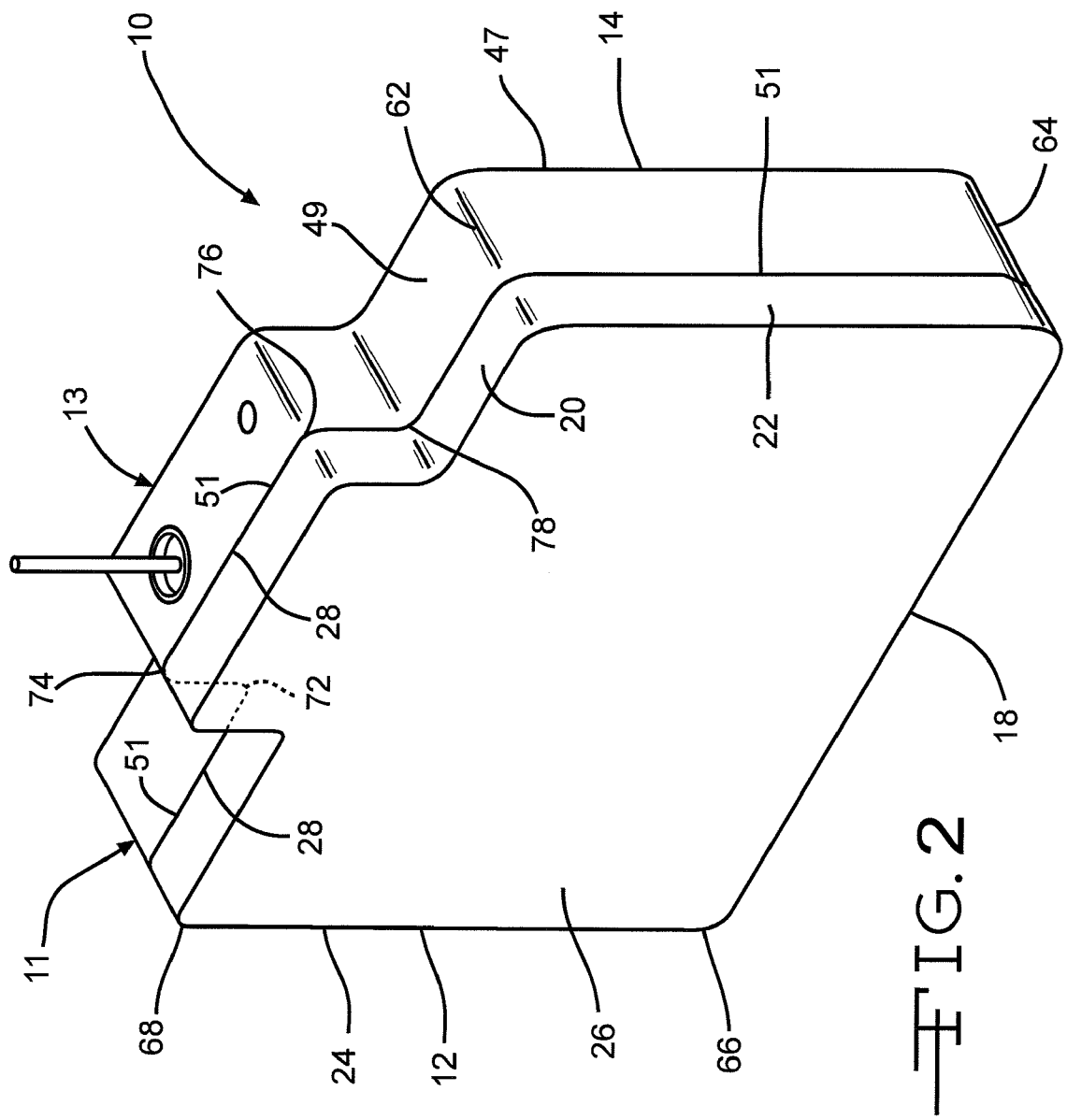
FIG. 2 is a perspective view of an electrochemical device comprising a metallic enclosure that is to be laser welded in accordance with the methods of the present invention.

FIG. 2 is a perspective view of an electrochemical device comprising a relatively thin metallic enclosure that is to be laser welded in accordance with the methods of the present invention. Electrochemical device 10 is comprised of a first casing member 12 and a second casing member 14 that are to be joined to each other to form enclosure 11.

In particular, the first casing member 12 comprises spaced apart side walls 18 and 20 extend to and meeting with spaced apart end walls 22 and 24. The side walls 18, 20 and the end walls 22, 24 meet each other at rounded corners and form a surrounding side wall, defining a perimeter extending to and meeting with major front wall 26. Opposite the front wall 26 is a continuous edge 28 of the perimeter of the surrounding side wall.

In like manner, the second casing member 14 comprises corresponding spaced apart side walls to and connecting with spaced apart end walls. The side walls and end walls meet at rounded corners and form a surrounding side wall, defining a perimeter extending to and meeting with a major front wall 47. Opposite the front wall is a continuous edge 51 of the perimeter of the surrounding side wall.

Enclosure 11 has a variety of shapes, including the shape depicted in the embodiment of FIG. 2. In this embodiment, the side walls and the end walls of enclosure 11 meet each other at external corners 62, 64, 66 and 68. The upper sidewall 13 of enclosure 11 is formed by sidewall 20 of casing member 12 and sidewall 49 of casing member 14, and includes internal corners 72 and 78 and external corners 74 and 76.

Alternatively, enclosure 11 may have a shape as described and shown in FIG. 1 of U.S. Pat. No. 6,613,474 to Frustaci et al., wherein the enclosure is comprised of sidewalls and end walls forming five external corners and one internal corner. Enclosure 11 of device 10 may also have a shape as described and shown in FIG. 1 of U.S. Pat. No. 6,850,405 to Mileham et al., or as described and shown in FIG. 1 of U.S. Pat. No. 7,012,799 to Muffoletto et al. Each of these patents is assigned to the assignee of the present invention and incorporated herein by reference. Enclosure 11 may be formed in many other shapes which include planar walls, arcuate walls, and radiused or sharp internal and external corners. It is to be understood that the above cited shapes are meant to be illustrative and not limiting.

Regardless of their particular shape, the first casing member comprises a first surrounding side wall defining a first perimeter and extending to and meeting with a continuous first major face wall. The second casing member comprises a second surrounding side wall defining a second perimeter and extending to and meeting with a continuous second major face wall.

The first and second casing members are typically of a metallic material in order that they may act as a portion of an electrode in the electrochemical device. Suitable materials include but are not limited to stainless steel and titanium, nickel, aluminum, mild steel, and tantalum. Alternatively, the casing members may be of a conductive polymer, or a polymer coated with a conductive material selected from stainless steel, titanium, nickel, aluminum, mild steel, and tantalum, provided that such polymers are joinable by laser welding.

Electrochemically active materials are then housed within the first casing member and/or the second casing member. The electrochemically active materials may be the anode active materials and cathode active materials of an electrochemical cell, or an electrolytic or electrochemical capacitor.

Regardless of the type of electrochemical device, the anode and cathode active materials are typically segregated from direct contact with each other by a separator. Separators are typically made of a polymeric material, paper, cellulose, and the like, and are easily damaged by the heat of laser welding. Exemplary electrochemically active materials and separator materials are described in the aforementioned patents to Frustaci et al., Mileham et al., and Muffoletto et al. Nonetheless, the methods of the present invention are not limited to providing welded enclosures for electrochemical devices. Many other materials may be placed in the casing members and sealed therein including, but not limited to, materials for implantable medical devices, sensors, audio devices, and imaging devices. The methods of the present invention are also applicable to providing welded enclosures for such devices.

Referring again to FIG. 2, after the desired electrochemical or other materials are placed in the first and/or second casing member, the first casing member 12 is mated with the second casing member 14. The first outer edge 28 of the first surrounding side wall of the first casing member 12 is in direct contact with a second outer edge 51 of the second surrounding side wall of the second casing member. This forms an interface between the casing members 12 and 14 housing the electrochemically active materials thereon. The casing members are thus in position for being joined together by welding at their interface 80.

As shown in FIG. 3, a laser welding apparatus 100 is provided for welding the casing members 12 and 14 together at the interface 80. As depicted by the dashed line designating the edge 28 of the first casing member 12, the sidewalls of the second casing member are somewhat longer. This provides for the sidewalls of the first casing member 12 to fit inside the sidewalls of the second casing member 14, but in a direct contact relationship. The laser welding apparatus 100 is comprised of a laser 102 for providing a laser beam 110, and a fixture (not shown) for holding and maintaining the first and second casing members 12 and 14 in direct contact with each other at interface 80 during welding.

Figure 3B:
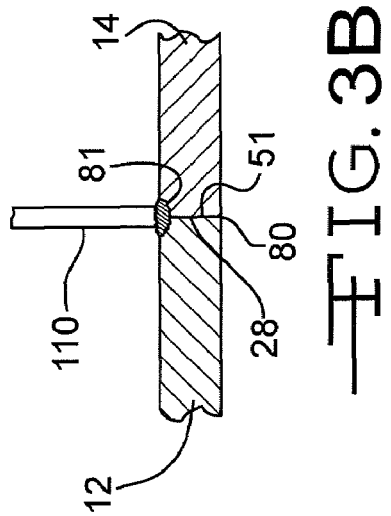
FIG. 3B is a cross sectional view taken along line 3B-3B of FIG. 3A of the interface between two casing members at the beginning of the laser welding process.
Figure 3C:
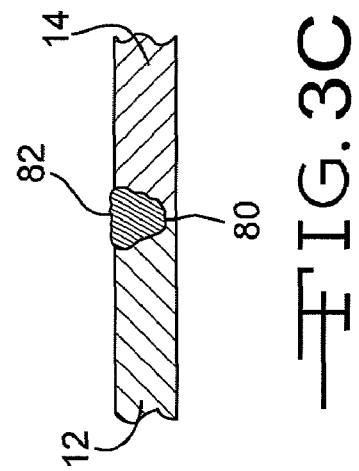
FIG. 3C is a cross sectional view taken along line 3C-3C of FIG. 3A of the two joined casing members after laser welding of the interface between them.
Figure 3A:
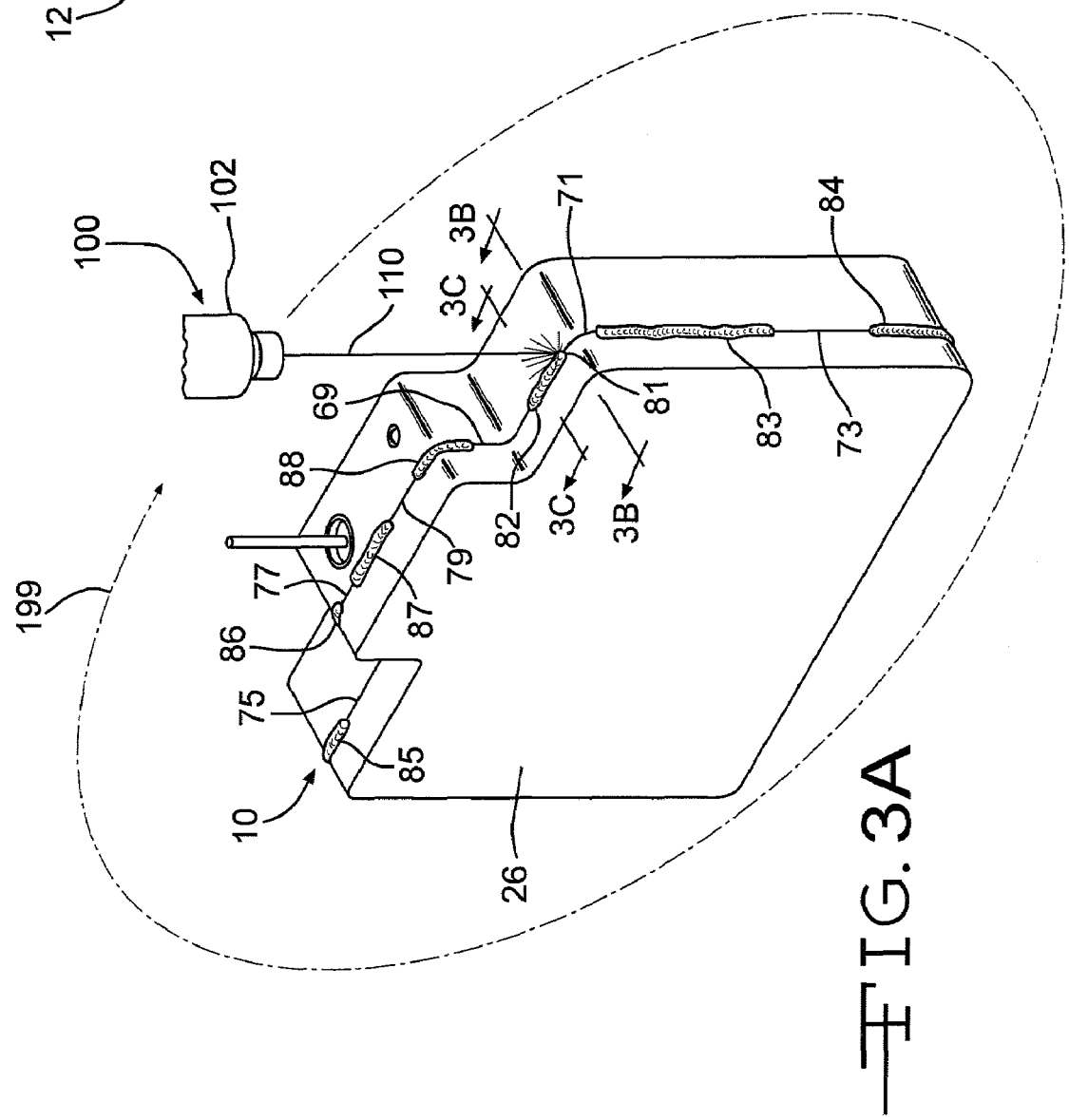
FIG. 3A is a perspective view of the enclosure shown in FIG. 2 during the performing of one embodiment of the present laser welding process.

In the embodiment depicted in FIGS. 3A to 3C, the edges 28 and 51 of casing members 12 and 14 are abutted against each other, forming interface 80 therebetween. When interface 80 or the major portion thereof is welded, a butt weld 82 is formed. As shown in FIG. 3B, when laser 110 impinges upon interface 80, an initial melt pool 81 is formed, fusing the interface material and joining casing members 12 and 14 with weld 82. The laser welding process may be operated in conduction welding mode, or keyhole welding mode, as described on pp. 4-5 and shown in FIG. 1.1 of *Laser Welding*," by W. W. Duley, $1^{st}$ Ed. Wiley-Interscience, 1998.

Although a butt weld 82 is depicted for joining the abutted edges 28 and 51 of casing members 12 and 14, this joining structure is considered exemplary and not limiting. Other mating arrangements and welded seam configurations are possible in practicing the methods of the present invention. See, for example, FIGS. 5 to 10 and the related description at columns 4 to 5 of the aforementioned U.S. Pat. No. 6,613,474 of Frustaci et al. in which several variants of overlap and butt weld seams are disclosed.

Figure 4:
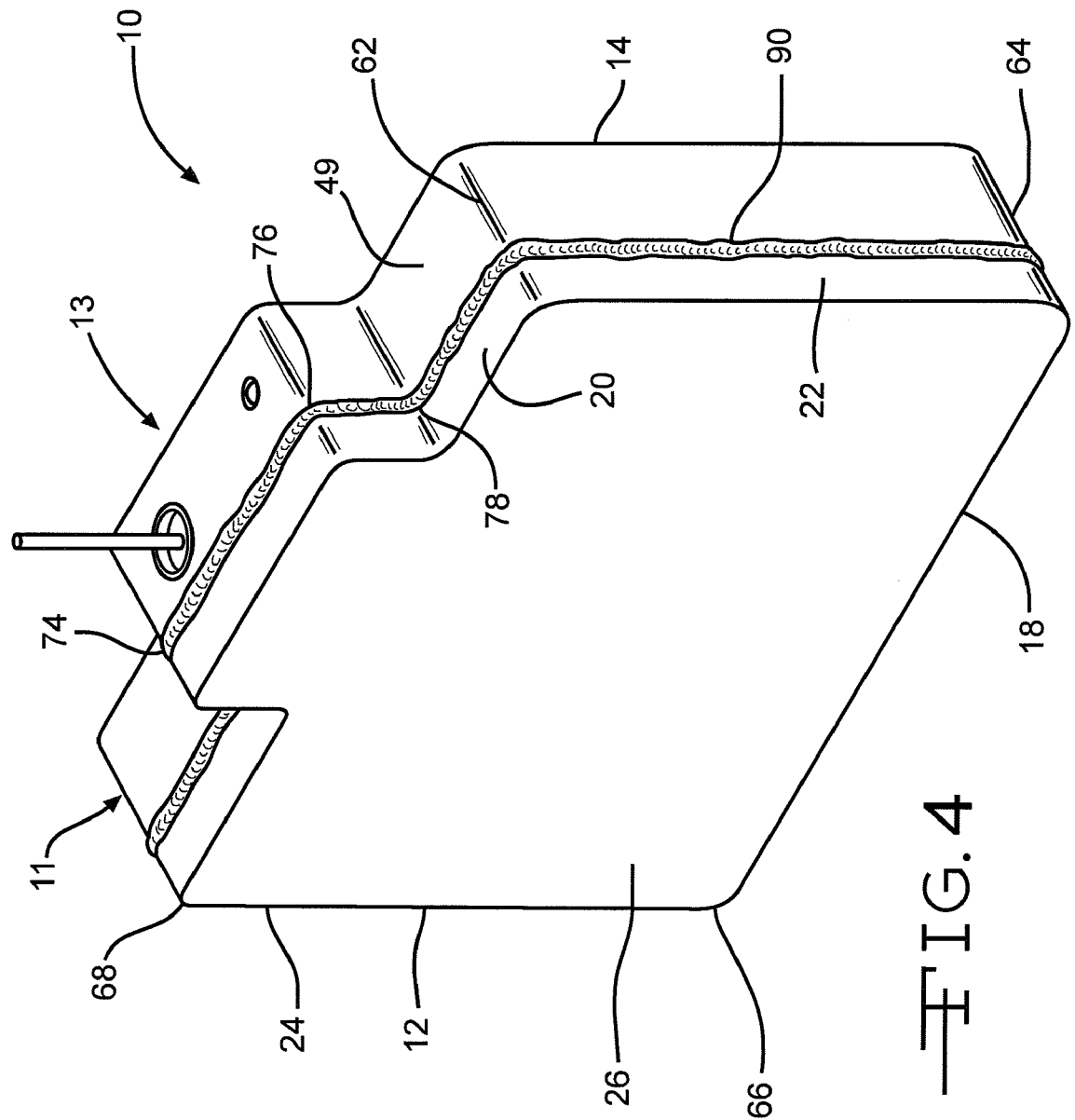
FIG. 4 is a perspective view of the electrochemical device shown in FIG. 2 comprising two casing members that have been laser welded to each other.

FIG. 4 is a perspective view of an electrochemical device comprising a thin metallic enclosure including the two casing members 12, 14 that have been laser welded to each other. Casing member 12 is joined to casing member 14 by welded seam 90, which is formed at the interface previously present between the surrounding sidewalls of casing members 12 and 14. This is done by traversing laser 102 in a 360 degree cycle relative to the casing members, as indicated by circular arrow

199 (FIG. 3A). (For the sake of illustration, the size of the welded seam 90 relative to the device enclosure has been enlarged.)

According to the present invention, it is disadvantageous to form welded seam 90 in a single pass. This is because localized temperatures within the casing near the seam can be raised sufficiently high to damage the internal components of the electrochemical device. The typically used separator materials are particularly vulnerable. As a countermeasure, clearances must be provided in proximity to weld seam 90, or insulators must be used which thermally protect the internal components of the electrochemical device. Both of these countermeasures occupy space within the electrochemical device that might otherwise be used for active materials, thereby lowering the volumetric efficiency of the device.

Referring again to the embodiment of FIGS. 3A to 3C, a first part of the laser welding of the casing members 12 and 14 to each other is performed by intermittently turning the laser beam 110 directed to the interface 80 on and off while traversing the laser 102 relative to the device 10 in a first welding pass 360 degrees along the perimeters of the casing members. In this manner, a first intermittent set of welded sections 82, 84, 86 and 88 and unwelded sections 69, 71, 73, 75, 77 and 79 at the interface 80 are formed.

Figure 6:
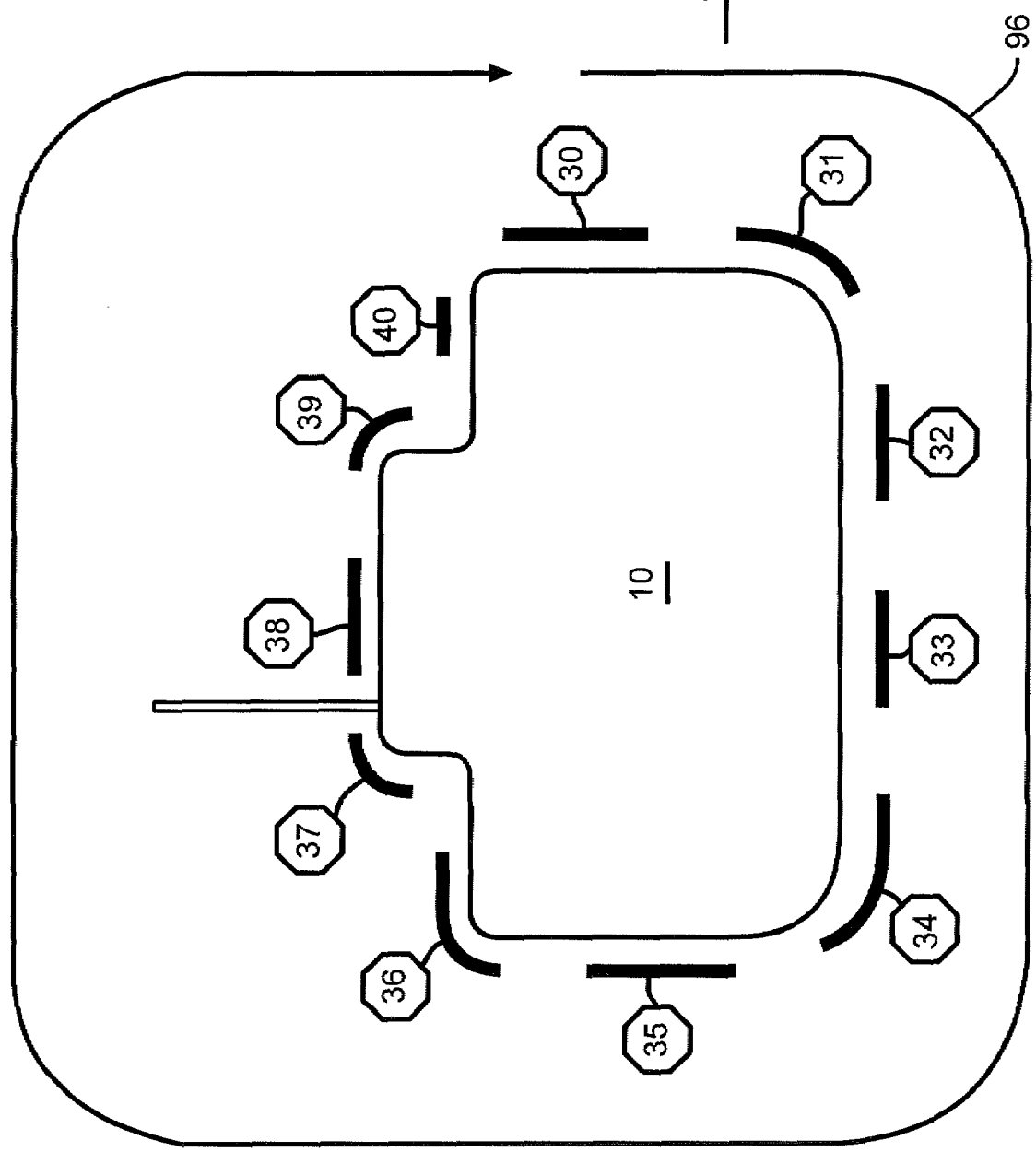
FIG. 6 is a schematic illustration of a first sequence of laser welds of the enclosure shown in FIG. 2 according to a first embodiment of the present invention.

This is best understood with reference also to FIG. 6, which is a schematic illustration of a first sequence of laser welds. In the first circumferential welding pass indicated by cyclic arrow 96, an intermittent set of welded sections depicted by hexagonal numerical designations 30, 31, 32, 33, 34, 35, 36, 37, 38, 39 and 40 is formed at interface 80, with intermittent unwelded sections between them.

A second part of the laser welding operation is then performed by intermittently turning the laser beam 110 on and off while traversing the laser 102 in a second welding pass 360 degrees along the perimeters of the casing members. A second intermittent set of welded and unwelded sections at the interface between the casing members is thus formed. This is best understood with reference to FIG. 7, which is a schematic illustration of a second sequence of laser welds. In the second circumferential welding pass indicated by cyclic arrow 97, an intermittent set of welded sections depicted by pentagonal numerical designations 41, 41, 42, 43, 44, 45, 46, 47, 48, 49, 50 and 51 is formed at interface 80.

Figure 7:
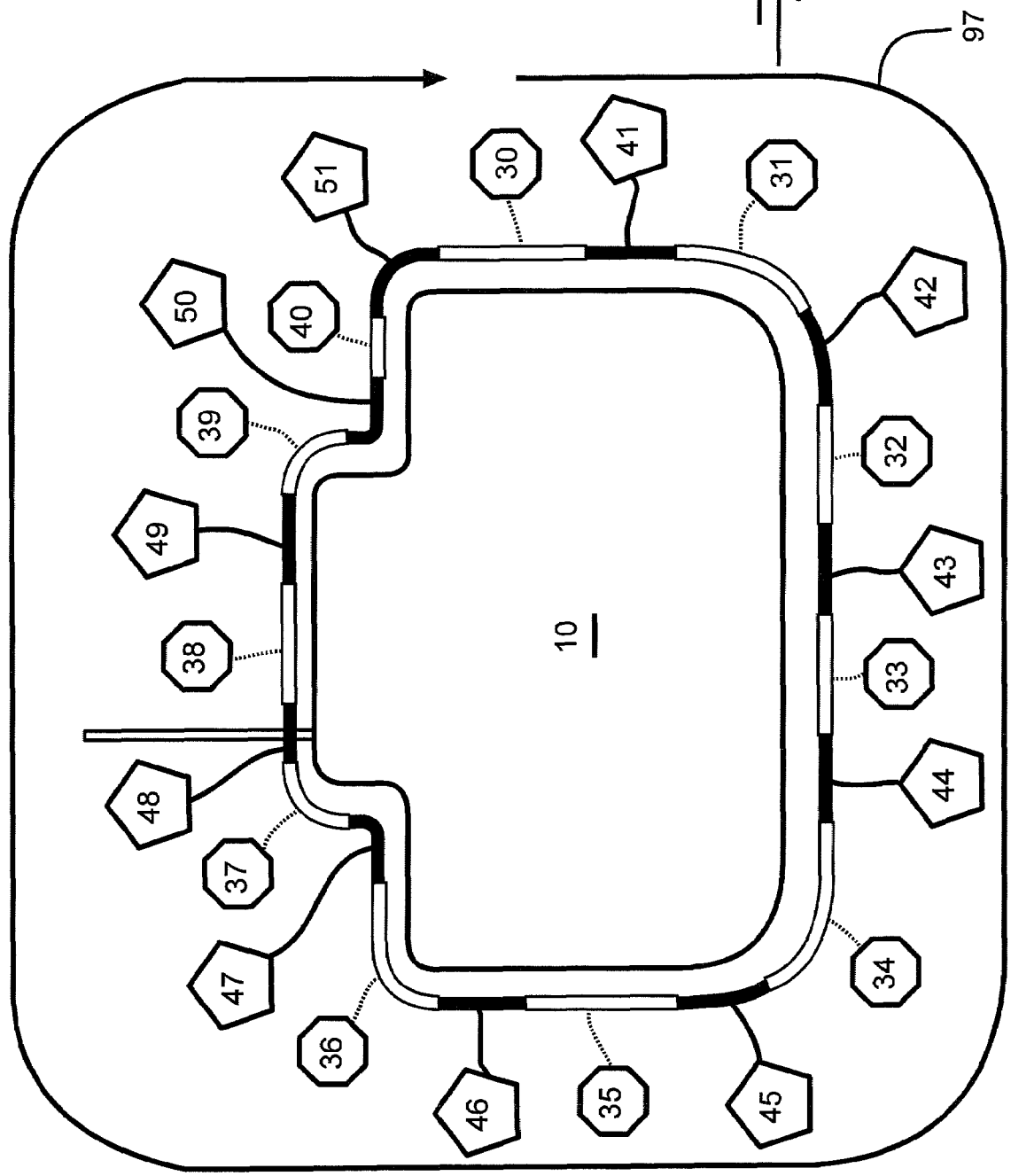
FIG. 7 is a schematic illustration of a second sequence of laser welds of the enclosure shown in FIG. 2 according to the first embodiment of the present invention.

In the embodiment depicted in FIGS. 6 and 7, the entire welding process is completed in two passes. In that respect, the first and second intermittent sets of welded sections form a continuously welded seam 90 at the interface 80 between the first and second casing members 12 and 14, as shown in FIG. 4. Welded seam 90 joins the casing members to each other and seals the interface 80 between them. In other embodiments, three or more passes may be used to form the continuously welded seam 90. It is noted that prior to performing the first circumferential pass, a preliminary welding pass may be performed in which the casing members 12 and 14 are tack welded to each other at two or more points.

Traversing of the laser circumferentially around and along the perimeters of the first and second casing members may be accomplished in various ways. As previously described, the laser 102 may be traversed around the interface 80 between the casing members 12 and 14 as indicated by circular arrow 199 of FIG. 3A. In this embodiment, the laser is rotated around an axis that is perpendicular to the first major face wall 26 of the first casing member 12 so that the laser beam is continually directed to the interface 80 between the casing members 12 and 14.

Figure 5:
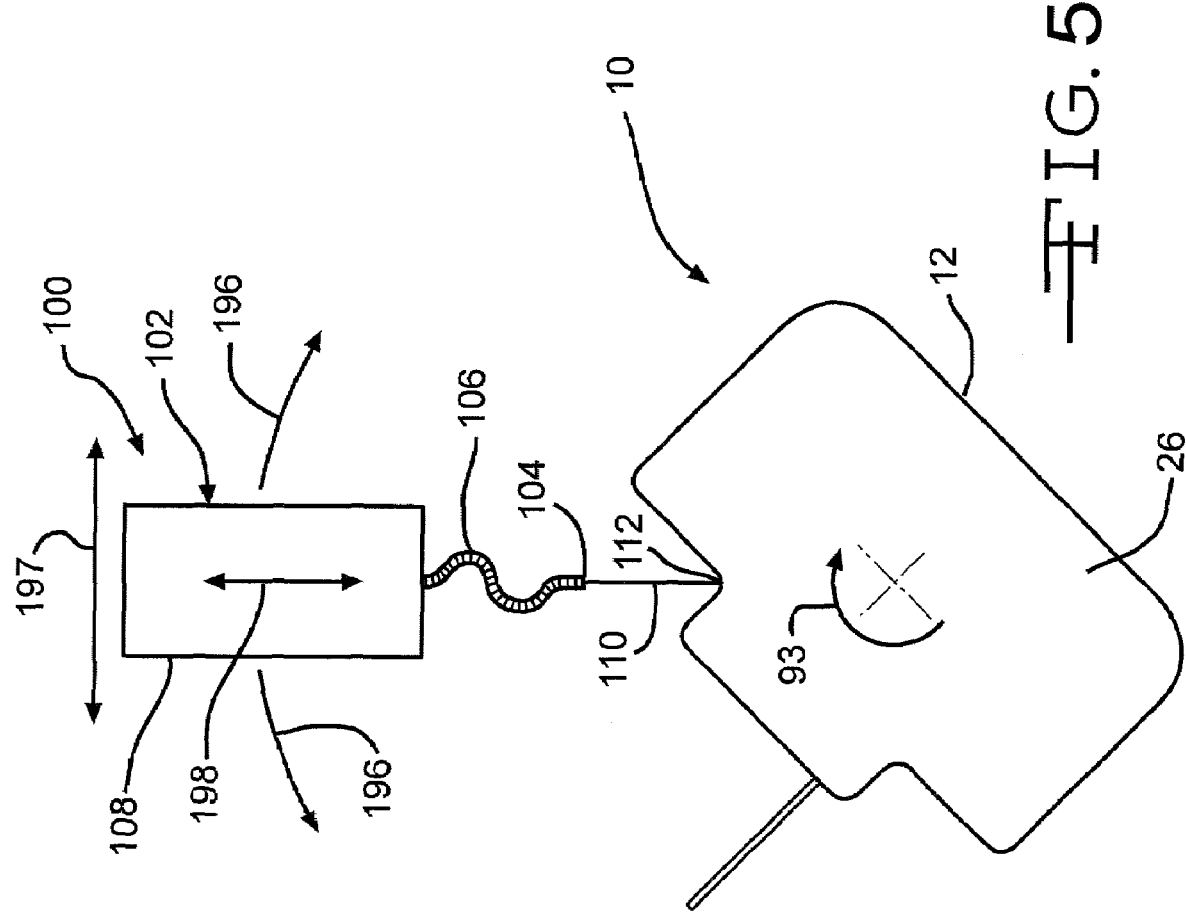
FIG. 5 is a schematic illustration of a side elevation view of the laser welding process of the enclosure shown in FIG. 2.

Other methods for traversing the laser circumferentially around the interface 80 of the casing members are best understood with reference to FIG. 5. This drawing is a schematic illustration of a side elevation view of the laser welding process and apparatus. In one such embodiment, the laser 102 is held in a fixed position, or a position of limited motion, and the first and second casing members are rotated around an axis that is perpendicular to the first major face wall 26 of the first casing member 12 and the second major face wall (not shown) of the second casing member 14. This is indicated by arcuate arrow 93.

The rotational speed of the first and second casing members 12 and 14 is controlled to account for the irregular shape of the members, such that the rate of traversal of the laser beam 110 along the interface 80 is maintained constant. Additionally, the laser 102 may be moved linearly as indicated by arrow 198, so that the length of the laser beam 110 is maintained constant. In other words, the distance from the laser output optics 104 to the point of incidence 112 on the interface 80 between the casing members is maintained at a constant distance. In this manner, the rate of traversal and the focus of the laser beam 110 on the interface 80 are maintained constant, and a more uniform seam weld is obtained.

The laser 102 may also be moved linearly as indicated by arrow 197 and rotationally as indicated by arcuate arrows 196 during traversal of the laser circumferentially around and along the interface 80 of the first and second casing members 12 and 14. This maintains the laser beam 110 perpendicular to the first surrounding sidewall of the first casing member 12 and the second surrounding sidewall of the second casing member 14. By maintaining this alignment, the angle of incidence of the laser beam 110 is perpendicular to the surrounding sidewalls of the casing members. Consequently, the spot size of the laser on the interface is maintained and a more uniform seam weld 90 is obtained. Additionally, data on the particular size and shape of the device 10 being welded may be provided to the laser welding control system (not shown). In that manner, the various linear and rotational actuators (not shown) that direct the laser may be controlled so that the rate of advancement of the laser beam 110 along the interface 80 between the casing members 12 and 14 is maintained constant. Such control also provides a more uniform seam weld.

However, when the surrounding sidewall of the first casing member 12 overlaps with the surrounding sidewall of the second casing member 14 and the interface 80 is at a 90 degree angle between the edge 28 of first casing member 12 and the surrounding sidewall of the second casing member 14, the laser beam may be tilted at an acute angle to more effectively provide the seam weld. One example of such an overlap seam weld is depicted in FIG. 10 of the aforementioned U.S. Pat. No. 6,613,474 of Frustaci et al.

The laser 102 of the laser welding apparatus 100 may comprise means for directing the laser beam. Referring again to FIG. 5, laser 102 includes beam directing means comprising a fiber optic cable disposed within a flexible sheath 106. The fiber optic cable and flexible sheath 106 may be of considerable length, i.e. several feet or more. In one embodiment, the housing 108 of laser 102 may be mounted in a stationary fixture, and traversal of the laser circumferentially around and along the perimeters of the first and second casing members 12 and 14 is accomplished by moving the fiber optic cable and flexible sheath 106 as indicated by arrows 196-198. As used herein, "moving the laser" includes moving the beam directing means such as the fiber optic cable and flexible sheath to direct the laser at the interface 80, the laser housing 108 containing the laser medium (not shown) is maintained stationary. Additionally or alternatively, the beam directing means may include lenses, prisms, mirrors, holograms, and other beam steering and/or focusing devices.

It is also understood that the first and second casing members need not have exactly the configurations as shown in FIGS. 2, 3A and 4, wherein the surrounding side wall of the first casing member 12 is drawn significantly away from major face wall 26 so that edge 28 is distal from face wall 26. The surrounding sidewall of the first casing member 12 can be much shorter than the surrounding side wall of the casing member 14, even to the extent where casing member 12 is a simple plate and the "surrounding side wall" is the edge of such plate. In such configurations, casing member 12 is still welded to casing member 14 in the manner previously described. Examples of such electrochemical device enclosures are depicted in FIG. 9 and FIG. 13 of the aforementioned U.S. Pat. No. 7,012,799 to Muffoletto et al. It is also noted that the methods of the present invention are applicable to welding of the dual capacitor enclosure depicted in FIG. 11 of the Muffoletto et al. patent, the dual capacitor comprising two welded seams.

The electrochemical device enclosure may have an irregular shape as depicted in FIGS. 2 to 5. In that respect, the interface between the casing halves may include exterior corners 62, 64, 66, 68, 74 and 76, and interior corners 72 and 78. Since heat transfer rates are generally higher at such corner regions, advantageous results may be obtained by welding a first half of a particular corner in a first welding pass and then welding the second half of the corner in a second pass. In one embodiment in which the casing halves include one or more interior corners, the interior corners 72 and 78 are welded in such a first half-to-second half sequence. In this manner, the heat flux into the device enclosure at the inner corners is maintained sufficiently low in order to keep the internal temperatures below the limit at which damage to the active materials and their separators can occur.

Figure 8:
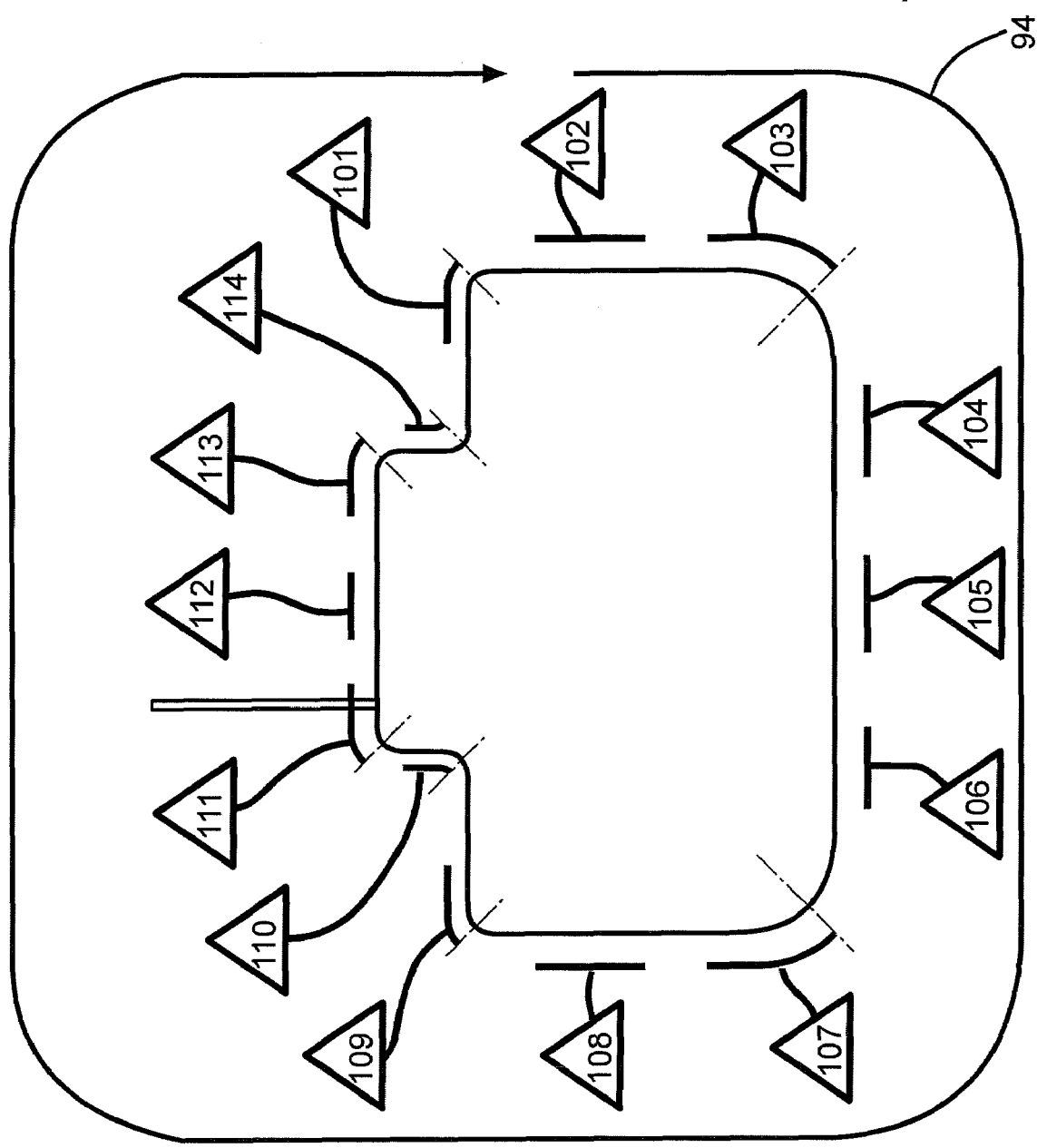
FIG. 8 is a schematic illustration of a first sequence of laser welds of the enclosure shown in FIG. 2 according to a second embodiment of the present invention.

In another embodiment, all of the internal and external corners of the device enclosure are welded in a first half-second half sequence, i.e., a first half of each corner is welded in a first welding pass and then a second half of the corners is welded in a second welding pass. FIG. 8 is a schematic illustration of the first sequence of laser welds, in which the first circumferential welding pass is indicated by cyclic arrow 94 and the intermittent first set of welded sections is depicted by triangular callouts 101, 102, 103, 104, 105, 106, 107, 108, 109, 110, 111, 112, 113 and 114. FIG. 9 is a schematic illustration of the second sequence of laser welds in which the second circumferential welding pass is indicated by cyclic arrow 95 and the intermittent second set of welded sections is depicted by square callouts 115, 116, 117, 118, 119, 120, 121, 122, 123, 124, 125, 126, 127 and 128.

It will be apparent that in other embodiments, the corner regions of the interface may be partitioned into smaller subdivisions than halves, such as thirds or quarters, and welded in multiple passes.

Many commercially available laser welding systems are suitable for performing the welding methods described herein. In one exemplary embodiment, a Model SLS 200 System sold by Lasag Industrial-Lasers of Arlington Heights, Ill. is used to weld casing members made of 304 stainless steel. This system includes a Nd:YAG laser operated at a wavelength of 1064 nanometers, 1.66 Joules per pulse, a pulse frequency of 41 Hz, a pulse width of 2 milliseconds, a beam spot size of about 0.020 inches, and a beam traverse speed of about 15 inches per minute. Argon may be used as a shielding gas to prevent localized metal oxidation in the weld zone, delivered at about 0.67 cubic feet per minute. Weld penetration is typically about 0.004 to 0.006 inches.

It is, therefore, apparent that there has been provided, in accordance with the present invention, a method for providing an electrochemical device enclosure including a welded seam. The practice of this invention enables elimination of clearances needed within the electrochemical device to separate internal components from damaging temperature and weld heat, elimination of insulators intended to isolate internal components from damaging temperature and weld heat, thereby allowing for more active materials and components within the device. For electrochemical devices such as batteries and capacitors, there is also a reduction in adverse effects of heat on the properties of cathode and anode active materials and electrolyte within the device. Seam welding process capability is also improved by enabling greater weld penetration at the interface to be welded, without incurring the negative impact of damaging higher internal temperatures within the device.

While this invention has been described in conjunction with preferred embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A method for providing an enclosure including a welded seam, comprising the steps of:
   a) providing a first and a second casing members of a weldable material;
   b) inserting a heat sensitive material within the first casing member;
   c) mating the first casing member to the second casing member with a first outer edge of the first casing member providing a perimeter in direct contact with t second casing member, thereby providing the enclosure housing the heat sensitive material therein;
   d) providing a laser;
   e) intermittently turning the laser on and off in a first welding pass around and along the perimeter of the first casing member contacting the second casing member such that a laser beam generated by the laser is directed to the perimeter, thereby providing at least two first intermittent welds spaced from each other by at least two unwelded sections at the perimeter, wherein each of the at least two first welds has a first weld starting point and a first weld end point, both of these weld points being located along the perimeter of the first casing member contacting the second casing member; and
   f) intermittently turning the laser on and off in a second welding pass such that the laser beam is directed to unwelded sections of the perimeter to provide at least two second intermittent welds, wherein each of the at least two second welds has a second weld starting point beginning at a first weld end point and a second weld end point ending at the beginning point of the next one of the first welds along the perimeter of the welded seam.

2. The method of claim 1 including selecting the first and second casing members from the group consisting of stainless steel, titanium, nickel, aluminum, mild steel, tantalum, a conductive polymer, and a polymer coated with a conductive material selected from stainless steel, titanium, nickel, aluminum, mild steel, and tantalum.

3. The method of claim 1 including providing the enclosure housing an electrochemical device.

4. The method of claim 1 including providing the enclosure housing a member selected from the group consisting of an implantable medical device, a sensor, an audio device, and an imaging device.

5. The method of claim 1 including providing the first casing member comprising a first surrounding side wall defining a first perimeter and extending to and meeting with a continuous first major face wall and providing the second casing member comprising a second surrounding side wall defining a second, perimeter and extending to and meeting with a continuous second major face wall.

6. The method of claim 1 including providing t welded seam as either a butt welded seam or an overlap welded seam.

7. The method of claim 1 including providing the first and second intermittent welds as a continuously welded seam at the perimeter of the first casing member contacting the second casing member.

8. The method of claim 1 including overlapping a portion of the first weld with the second weld.

9. The method of claim 1 including traversing the laser circumferentially around and along the perimeter of the first casing member contacting the second casing member by rotating the first and second casing members around an axis that is perpendicular to a first major face wall of the first casing member and a second major face wall of the second casing member.

10. The method of claim 9 further comprising the step of moving the laser linearly during the traversing of the laser circumferentially around and along the perimeter of the first casing member contacting the second casing member, such that the length of the laser beam is constant.

11. The method of claim 9 further comprising the step of moving the laser linearly and rotationally during the traversing of the laser circumferentially around and along the perimeter of the first casing member contacting the second casing member, such that the laser beam is maintained perpendicular to a first surrounding sidewall of the first casing member and a second surrounding sidewall of the second casing member.

12. The method of claim 1 including advancing the laser beam along the perimeter of the first casing member contacting the second casing member at a substantially constant rate.

13. The method of claim 1 including traversing the laser circumferentially around and along the perimeter of the first casing member contacting the second casing member with the casing members being maintained substantially stationary.

14. The method of claim 1 including traversing the laser circumferentially around and along the perimeter of the first casing member contacting the second casing member with the laser being maintained substantially stationary.

15. The method of claim 1 including mating the first casing member to the second casing member to provide the enclosure comprising at least one inner corner, and then welding a first half of the at least one inner corner in the first welding pass and then a second half of the at least one inner corner in the second welding pass.

16. The method of claim 1 wherein the enclosure formed by mating the first casing member to the second casing member is comprised of two inner corners, and wherein a first half of the first inner corner and a first half of the second inner corner are welded in the first welding pass and a second half of the first inner corner and a second half of the second inner corner are welded in the second welding pass.

17. The method of claim 1 wherein the enclosure provided by mating the first casing member to the second casing member is comprised of a plurality of corners, each corner comprising a first half and a second half, and wherein the first halves of the corners are welded in the first welding pass and the second halves of the corners are welded in the second welding pass.

18. A method for providing an electrochemical device enclosure including a welded seam, comprising the steps of:

a) providing a first casing member comprising a first surrounding side wall defining a first perimeter including at least one inner corner and at least one outer corner extending to and meeting with a continuous first major face wall, and providing a second casing member comprising a second surrounding side wall defining a second perimeter including at least one inner corner and at least one outer corner extending to and meeting with a continuous second major face wall, wherein the first and second casing members are of a weldable material;

b) inserting electrochemically active materials within the first casing member;

c) mating the first casing member to the second casing member with a first outer edge of the first surrounding side wall providing a perimeter in direct contact with the second surrounding side wall, thereby forming the enclosure housing the electrochemically active materials including at least one inner corner and one outer corner;

d) providing a laser;

e) intermittently turning the laser on and off in a first welding pass around and along the perimeter of the first casing member contacting the second casing member such that a laser beam generated by the laser is directed to the perimeter, thereby providing at least two first intermittent welds spaced from each other by at least two unwelded sections at the perimeter, wherein each of the at least two first welds has a first weld starting point and a first weld end point, both of these weld points being located along the perimeter of the first casing member contacting the second casing member and wherein one of the first intermittent welds includes a first portion of the at least one inner corner; and f) intermittently turning the laser on and off in a second welding pass such that the laser beam is directed to unwelded sections of the perimeter to provide at least two second intermittent welds, wherein each of the at least two second welds has a second weld starting point beginning at a first weld end point and a second weld end point, ending at the beginning point of the next one of the first welds along the perimeter of the welded seam and wherein one of the second, intermittent welds includes a second portion, of the at least one inner corner.

19. The method of claim 18 including providing the welded seam as either a butt welded seam or an overlap welded seam.

20. The method of claim 18 including providing the first and second intermittent welds as a continuously welded seam at the perimeter of the first casing member contacting the second casing member.

21. The method of claim 18 including traversing the laser circumferentially around and along the perimeter of the first casing member contacting the second casing member by rotating the casing members around an axis that is perpendicular to the first major face wall of the first casing member and the second major face wall of the second casing member.

22. The method of claim 18 including moving the laser linearly while traversing circumferentially around and along the perimeter of the first casing member contacting the second casing member, such that the length of the laser beam is constant.

23. The method of claim 18 including moving the laser linearly and rotationally while traversing the laser circumferentially around and along the perimeter of the first casing member contacting the second casing member, such that the laser beam is maintained perpendicular to the first surrounding sidewall of the first casing member and the second surrounding sidewall of the second casing member.

24. The method of claim 18 including advancing the laser beam along the perimeter of the first casing member contacting the second casing member at a substantially constant rate.

25. A method for providing an electrochemical device enclosure including a welded seam, comprising the steps of:
   a) providing a first casing member comprising a first surrounding side wall including a plurality of corners extending to and meeting with a continuous first major face wall, and providing a second casing member comprising a second surrounding side wall including a plurality of corners extending to and meeting with a continuous second major face wall, wherein the first and second casing members are of a weldable material;
   b) inserting electrochemically active materials within the first casing member;
   c) mating the first casing member to the second casing member with a first outer edge of the first surrounding side wall providing a perimeter in direct contact with the second surrounding side wall, thereby providing the enclosure housing the electrochemically active materials and including a plurality of corners, each corner comprising a first corner portion and a second corner portion;
   d) providing a laser;
   e) intermittently turning the laser on and off in a first welding pass around and along the perimeter of the first casing member contacting the second casing member such that a laser beam generated by the laser is directed to the perimeter, thereby providing at least two first intermittent welds spaced from each other by at least two unwelded sections at the perimeter, wherein each of the at least two first welds has a first weld starting point and a first weld end point, both of these weld points being located along the perimeter of the first casing member contacting the second casing member and wherein the first portion of the corners are welded in the first welding pass; and
   f) intermittently turning the laser on and off in a second pass such that the laser beam is directed to the unwelded sections of the perimeter to provide at least two second intermittent welds, wherein each of the at least two second welds has a second weld starting point beginning at a first weld end point and a second weld end point ending at the beginning point of the next one of the first welds along the perimeter of the welded seam including the second portion of the corners.

26. The method of claim 25 including providing the welded seam as either a butt welded seam or an overlap welded seam.

27. The method of claim 25 wherein the first and second intermittent welds provide a continuously welded seam at the perimeter of the first casing member contacting the second casing member.

28. The method of claim 25 including traversing the laser circumferentially around and along the perimeter of the first casing member contacting the second casing member by rotating the casing members around an axis that is perpendicular to the first major face wall of the first casing member and the second major face wall of the second casing member.

29. The method of claim 28 including moving the laser linearly during the traversing of the laser circumferentially around and along the perimeter of the first casing member contacting the second casing member, such that the length of the laser beam is constant.

30. The method of claim 28 including moving the laser linearly and rotationally during the traversing of the laser circumferentially around and along the perimeter of the first casing member contacting the second casing member, such that the laser beam is maintained perpendicular to the first surrounding sidewall of the first casing member and the second surrounding sidewall of the second casing member.

31. The method of claim 25 including advancing of the laser beam along the perimeter of the first casing member contacting the second casing member at a substantially constant rate.

32. A method for providing an enclosure including a welded seam, comprising the steps of:
   a) providing a first and a second casing members of a weldable material;
   b) inserting a heat sensitive material within the first casing member;
   c) mating the first casing member to the second casing member with a first outer edge of the first casing member providing a perimeter in direct contact with the second casing member, thereby providing the enclosure housing the heat sensitive material therein;
   d) providing a laser;
   e) intermittently turning the laser on and off in a first welding pass around and along the perimeter of the first casing member contacting the second casing member such that a laser beam generated by the laser is directed to the perimeter, thereby providing at least two first intermittent welds spaced from each other by at least two unwelded sections at the perimeter, wherein each of the at least two first welds has a first weld starting point and a first weld end point, both, of these weld points being located along the perimeter of the first casing member contacting the second casing member;
   f) intermittently turning the laser beam on and off in a second welding pass such that the laser beam is directed to unwelded sections of the perimeter, wherein each of the at least two second intermittent welds has a second weld starting point beginning at a first weld end point and a second weld end point ending at a location spaced from the beginning point of the next one of the first welds along the perimeter; and
   g) intermittently turning the laser on and off in a third welding pass such that the laser beam, is directed to unwelded sections of the perimeter, wherein each of the at least two third intermittent welds has a third weld starting point beginning at a second weld end point and a third weld end point ending at the beginning point of the next one of the first welds along the perimeter of the welded seam.

33. A method for providing an enclosure including a welded seam, comprising the steps of:
   a) providing a first and a second casing members of a weldable material;
   b) inserting a heat sensitive material within the first casing member;
   c) mating the first casing member to the second casing member with a first outer edge of the first casing member providing a perimeter in direct contact with the second casing member, thereby providing the enclosure housing the heat sensitive material therein;
   d) providing a welding apparatus;
   e) intermittently turning the welding apparatus on and off in a first welding pass around and along the perimeter of the first casing member contacting the second casing member, thereby providing at least two first intermittent welds spaced from each other by at least two unwelded sections at the perimeter, wherein each of the at least two first welds has a first weld starting point and a first weld end point, both of these weld points being located along the perimeter of the first casing member contacting the second casing member; and f) intermittently turning the welding apparatus on and off in a second welding pass along the perimeter to provide at least two second intermittent welds, wherein each of the at least two second welds has a second weld starting point beginning at a first weld end point and a second weld end point ending at the beginning point of the next one of the first welds along the perimeter of the welded seam.

* * * * *

UNITED STATES PATENT AND TRADEMARK OFFICE
CERTIFICATE OF CORRECTION

PATENT NO. : 7,968,817 B2  
APPLICATION NO. : 11/548314  
DATED : June 28, 2011  
INVENTOR(S) : Gary L. Freitag, Dominick Frustaci and Mark J. Roy It is certified that error appears in the above-identified patent and that said Letters Patent is hereby corrected as shown below:

Column 10, line 31 - "t" should be "the"

Column 11, line 6 - "t" should be "the"

Signed and Sealed this

Twenty-seventh Day of September, 2011

David J. Kappos
*Director of the United States Patent and Trademark Office*